United States Patent

[11] 3,617,606

[72] Inventor John C. Dutton
Rome, Ga.
[21] Appl. No. 47,742
[22] Filed June 19, 1970
[45] Patented Nov. 2, 1971
[73] Assignee General Electric Company

[54] SHIELDED BUSHING CONSTRUCTION
10 Claims, 2 Drawing Figs.
[52] U.S. Cl. .................................................. 174/31 R, 174/143
[51] Int. Cl. .................................................. H01b 17/28
[50] Field of Search .................................. 174/18, 31 R, 73 R, 142, 143

[56] References Cited
UNITED STATES PATENTS

| | | | |
|---|---|---|---|
| 1,304,283 | 5/1919 | Eby | 174/31 R UX |
| 1,350,936 | 8/1920 | Peek, Jr. | 174/143 X |
| 1,387,389 | 8/1921 | Haberli et al. | 174/73 R X |
| 1,651,234 | 11/1927 | Stolz | 174/143 |
| 1,945,917 | 2/1934 | Scarpa | 174/31 R |
| 1,972,590 | 9/1934 | Higgins | 174/142 |
| 2,263,768 | 11/1941 | Frakes | 174/143 X |
| 2,411,656 | 11/1946 | Henderson et al. | 174/73 R |
| 3,049,581 | 8/1962 | Palmieri | 174/73 R |
| 3,234,322 | 2/1966 | Frowein | 174/31 R |
| 3,277,423 | 10/1966 | Rose | 174/143 X |

FOREIGN PATENTS

| | | | |
|---|---|---|---|
| 1,371,872 | 8/1964 | France | 174/73 R |
| 612,061 | 11/1948 | Great Britain | 174/142 |

Primary Examiner—Laramie E. Askin
Attorneys—J. Wesley Haubner, Barry A. Stein, Frank L. Neuhauser, Oscar B. Waddell and Joseph B. Forman ABSTRACT: This disclosure relates to a capacitive core bushing which is adapted to be connected to a grounded, dielectric fluid filled, tank housing high voltage electrical apparatus. The bushing comprises a through conductor, a capacitive core surrounding the conductor and a housing around the core comprising upper and lower insulating shells. A conductive electrostatic field control electrode is provided, the potential of which is intermediate the line voltage and ground, located in the lower portion of the bushing, adjacent the point at which the through conductor emerges from the lower insulating shell. The field control electrode is preferably formed as a conductive ring and maintained at a selected intermediate potential by a connection to an equipotential surface of the capacitive bushing core. The field control electrode is embedded in a bushing cap of high-dielectric strength material through which the central conductor emerges at the lower end of the bushing. In a modified form a second electrostatic field control electrode is embedded in the bushing cap between the point of emergence of the through conductor and the first field control electrode and is electrically connected to a point at line potential.

PATENTED NOV 2 1971  3,617,606
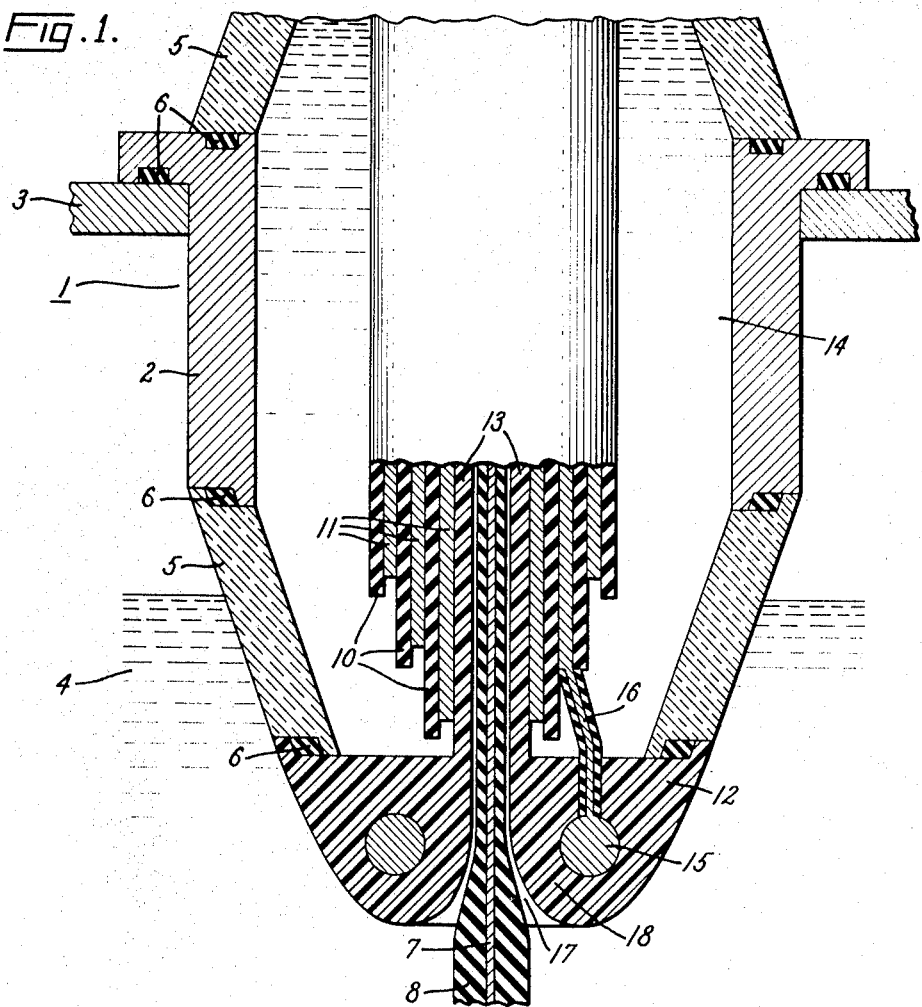
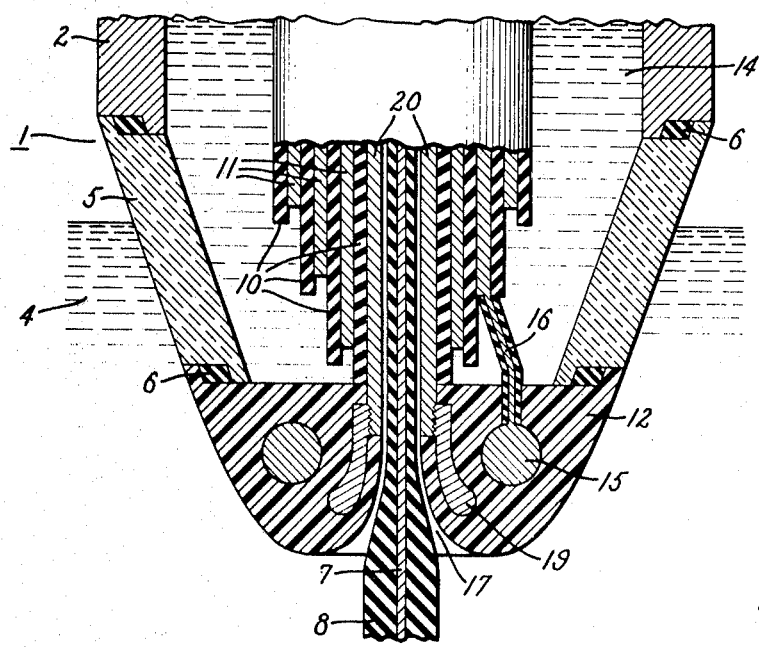
INVENTOR:
JOHN C. DUTTON
BY Barry A. Stein
ATTORNEY

SHIELDED BUSHING CONSTRUCTION

BACKGROUND AND OBJECTS OF THE INVENTION

This invention relates to electrical bushings, and more in particular to an improved lower insulating assembly for a high-voltage insulating bushing adapted to be utilized in a dielectric fluid filled electrical apparatus such as transformers, circuit breakers and the like.

High-voltage electrical insulating bushings generally comprise a central conductor extending axially therethrough, at least the central portion of the central conductor being surrounded by a capacitive voltage-distributing core made up of alternate insulating and conducting layers, with the entire assembly being surrounded by a housing comprising stacked ceramic shells. A conducting sleeve disposed between the ceramic shells is provided for mounting purposes. A dielectric fluid, commonly oil, is provided in the interior of the bushing for insulating and cooling purposes.

When used in high-voltage transformer applications the bushings are generally mounted on a grounded transformer tank by their conductive sleeves so that their lower end portions extend into the transformer tank and under the oil contained therein.

Since the point at which the central conductor emerges from the bushing at its lower end is at the full line potential, while the tank and conducting sleeve are at ground potential, the lower portion of the bushing and the immediately surrounding oil are subject to the full line voltage and the voltage gradient in the end region will be very high. This necessitates the use of relatively long lower bushing parts in order to provide the requisite spacing between the bushing end and the grounded sleeve, to preclude dielectric breakdown and arcing. In very high voltage applications the spacing required has been so great as to necessitate the use of huge transformer tanks thereby increasing manufacturing as well as shipping costs.

By reducing the voltage gradient at the location where the central conductor emerges at the bottom of the bushing, the spacing between this location and the grounded sleeve (i.e., the length of the lower bushing part) can be reduced. This will also reduce the distance necessary to insulate between the tank wall (or other metallic parts) and the lower end of the bushing. These reductions will result in distinct economic advantages.

Accordingly, it is an object of this invention to provide a high voltage bushing so constructed that its lower end portion is subjected to only a part of the available line to ground voltage.

It is another object of this invention to provide means to decrease the voltage gradient on the lower end portion of a high-voltage bushing, and in the adjacent oil.

It is a further object of this invention to provide a high-voltage bushing having a shorter lower portion than prior art bushings of corresponding voltage ratings.

It is a further object of this invention to provide a high-voltage bushing, the lower end of which can be located closer to a tank wall through which it passes than would be possible with a bushing of conventional design.

SUMMARY OF THE INVENTION

In carrying out my invention in one form I provide a high-voltage oil-filled bushing which is adapted to be mounted on a grounded tank housing a transformer or other electrical apparatus. The bushing includes an electrostatic field control electrode whose potential is intermediate the line voltage and ground, located in the lower portion of the bushing adjacent the point at which the through or central conductor emerges Therefore, the voltage gradient at the lower end portion of the bushing is reduced. The field control electrode comprises a conductive ring which is embedded in an insulating material; as for example a polymer, which serves to cap the lower end of the bushing. The conductive ring is raised to the intermediate potential by electrically connecting it to one of the equipotential surfaces making up the capacitive, voltage-distributing, bushing core.

In the above described arrangement the oil immediately adjacent the emerging central conductor and the polymer-bushing cap will be stressed electrically. Therefore, the potential to which the intermediate electrode is raised is chosen such that the gradient produced will be insufficient to overstress the oil (which usually has a lower dielectric strength than the polymer and cable insulation.

For extremely high-voltage applications I provide a modification to my previously discussed bushing, so that the necessarily high gradient will be confined to the polymer-capping member (which can tolerate the electrical stress better than oil. In carrying out this modification, I provide another electrostatic field control electrode embedded in the polymer-capping member. This additional electrode is electrically connected to the central conductor so as to be at line potential.

In either of the two aforementioned embodiments I provide that the central conductor is an insulated cable, whose insulation increases in thickness as the conductor emerges from the bushing and extends away from the intermediate potential electrostatic field control electrode, or the line potential electrostatic field control electrode. At the point where the insulated central conductor is sufficiently far away from the electrode that it can withstand the local gradients involved, the thickness of its insulation is constant.

BRIEF DESCRIPTION OF THE DRAWINGS

This invention will be better understood and its various objects and advantages will be more fully appreciated from the following description taken in conjunction with the accompanying drawings in which:

FIG. 1 is a cross-sectional view of a portion of a bushing embodying features of the present invention attached to a grounded oil-filled transformer tank, or other high-voltage apparatus.

FIG. 2 is a cross-sectional view of a portion of a modified bushing embodying features of the present invention attached to a grounded oil-filled transformer tank, or other high-voltage apparatus.

DESCRIPTION OF THE PREFERRED EMBODIMENTS

In the drawing; FIG. 1 shows a fluid insulated, high-voltage electrical bushing 1. According to conventional practice, the bushing includes a conductive attaching means such as sleeve or ring 2, for mounting same to a wall of a grounded enclosure or tank 3 containing electrical apparatus, such as a high-voltage power transformer. In such a construction the interior of tank 3 is filled with a dielectric fluid, such as oil 4, for insulating the high-potential apparatus parts from the grounded tank.

The bushing 1 itself is seen to comprise a plurality of ceramic shells 5 which are attached on each side of flanged mounting ring 2. In order to provide a fluid tight seal, gaskets 6 are disposed between abutting bushing parts, and between tank 3 and the flange of ring 2. A central conductor, at line potential, is provided for connection to the electrical apparatus inside the tank. The central conductor is preferably made up of a cable comprising a conductor 7 with insulation 8 thereon. As can be seen, the insulation on the lower portion of the central conductor is of increased thickness. The reason for this construction will be explained later.

Surrounding the central conductor, a capacitive-voltage-distributing bushing core is provided. This core is constructed of alternate insulator layers 10 and conductor layers 11. As should be appreciated each conductive layer 11 provides an equipotential surface for aiding in distributing the line to ground voltage in the bushing.

Capping members are provided to close off the bushing ends an thereby create a fluid tight self-contained enclosure. As can be seen from FIG. 1 only the domed lower capping means 12 is shown. The upper end of the bushing may be capped in any conventional manner (e.g., utilizing a clamping nut.) Capping means 12 preferably includes a tubular extension 13 running axially through the bushing 1. The tubular extension provides a readily accessible means for centrally clamping the bushing structure together. A threaded upper end (not shown) of the tubular extension may be provided with a clamping nut for sandwiching the ceramic shells 5, the gaskets 6 and the ground ring 2 together between it and the capping means 12. So constructed, a fluid-tight-bushing structure is provided, which may be filled with a suitable dielectric fluid, such as oil 1.

A portion of bushing 1 extends into tank 3 and is submerged under the oil 4 therein contained. Since the central conductor is at line potential the full line to ground electric field will exist between it and the ground ring 2. At the lowermost point of bushing, where the central conductor emerges, the maximum electrical stress will exist. In high-voltage applications the distance separating this point and the ground ring is necessarily made large, to provide a gradient which does not locally overstress the insulation. Therefore, long ceramic shells are required for the bushing parts disposed inside the transformer tank. This design requirement is a costly one, in that large tanks and correspondingly large amounts of oil are required. Further, as the size of the tank increases, shipping costs increase. In fact a point will be reached wherein the tanks, themselves, may be too huge for conventional shipping at all. Accordingly, the need for smaller high-voltage bushings presently exists and will become critical as equipment is built pushing the state of the art voltages to even higher levels.

In order to decrease the length of the bushing parts, which are disposed inside the apparatus tank, I provide means for reducing the potential gradient existing at the lowermost bushing point. In so doing, the electrostatic stress on the lower bushing parts and the immediately surrounding oil is reduced. I accomplish this end by utilizing an electrostatic field control electrode, whose potential is intermediate the line voltage and ground, at a point closely adjacent the lowermost end of the bushing. This results in the lower portion of the bushing and the immediately surrounding oil being exposed to less stress per unit length than heretofore possible with prior art bushings operating at corresponding voltage levels.

The intermediate voltage electrode is shown as comprising a conductive ring 15 which is enclosed in capping means 12. Conductive ring 15 is electrically connected, by insulated conductor 16, to one of the equipotential conducting surface 11 making up the capacitive, voltage-distributing bushing core. This raises the potential of ring 15 to the potential of that surface (which is, of course, intermediate the line potential and ground.)

As should be appreciated, by utilizing an intermediate voltage electrode to create an intermediate voltage point in capping means 12 the available potential is divided into two components, those being: (1) line potential to intermediate potential; and (2) the intermediate potential to ground. The line-to-intermediate potential can be made relatively small, by selecting an intermediate potential closer to the line potential than to ground. But, in so doing, the intermediate-to-ground potential would be necessarily large. This division provides some control of the local voltage gradients in highly stressed regions.

Capping means 12 is constructed of material having a high mechanical and dielectric strength, such as a glass-reinforced epoxy. Therefore, the high-potential gradient, in the region of the field control electrode ring (i.e., within the capping means), can be safely tolerated. The conductive ring 15 is completely imbedded in the capping means 12. This is preferably accomplished by casting in order to assure complete adherence of the epoxy to the conductive ring, and thus preclude the formation of voids. For even more intimate joining, the ring may include a plurality of perforations.

As can be seen from FIG. 1, the central conductor emerges from the lower end of the bushing in the immediate vicinity of the intermediate voltage electrode. In this area the insulation 8 on the cable can be relatively thin, owing to the reduced gradient created by the intermediate voltage electrode 15. But, as the central conductor extends away from the lower bushing end, and thus from the intermediate voltage electrode, the electrostatic stress on the central conductor may increase (due to the gradual reexposure to line potential.) Therefore, I provide that the insulation on the central conductor increases in cross sectional area as the conductor emerges from the bushing. At the point where central conductor is subjected to the full line voltage the thickness of the insulation can be made constant.

As is known in the art, when two materials having different dielectric constants are serially connected, any voltage applied across the combination divides in inverse proportion to their respective dielectric constants. Therefore, should oil exist in series with a higher dielectric constant material (e.g., epoxy), the larger portion of the available applied voltage will necessarily exist across the oil. In the bushing construction shown in FIG. 1 a layer of oil 17 is disposed in series with a portion 18 of the capping means 12, between the central conductor 7 and the intermediate electrode 15. In extremely high voltage applications the dielectric strength of the oil will, therefore, be a limiting factor, notwithstanding the fact that the potential across the series combination is only a portion of the available line-to-ground potential.

In applications wherein the voltage stress would be necessarily high, due to an extremely high line potential, I modify the bushing of FIG. 1 to provide means wherein the high-stress portion of the line to intermediate voltage electric field is confined to the high-dielectric strength capping means alone. In so doing, I am able to insure that the large dielectric stress created by this field can be safely tolerated by the capping means. FIG. 2 shows a bushing, similar to that of FIG. 1, but modified in accordance with the above-discussed feature.

As can be seen therein, an additional electrostatic field control electrode 19 is provided embedded in capping means 12. This additional electrode is preferably a flared ringlike member which is threaded onto a conductive tube 20. The conductive tube 20 is raised to line potential by connecting it to the central conductor at the upper end of the bushing (not shown.) So connected, no voltage gradient exists between the emerging central conductor and the additional electrode. In this regard the additional electrode 19 acts as a line shield. Thus, the oil layer 17 remains unstressed, since the line-to-intermediate electric field in this region is confined within the capping member between the additional electrode 19 and the intermediate electrode 15.

Conductive tube 20 may be threaded at its upper end portion to accommodate a clamping nut so as to provide a central-clamping feature (analogous to that provided by tubular extension 13 of FIG. 1).

While particular embodiments of my invention have been shown and described, it will be obvious to those skilled in the art that various changes and modifications may be made without departing from my invention in its broader aspects. For example, I contemplate utilizing additional electrostatic field control electrodes in the capping means, each of these additional electrodes being at different intermediate voltages, so as to further control the electrical field and the magnitude of various local gradients. I therefore intend to cover all such changes and modifications as fall within the true scope and spirit of my invention.

What I claim and desire to secure by Letters Patent of the United States is:

1. In a dielectric fluid filled high-voltage bushing comprising an electrically conductive sleeve adapted to be connected to a grounded apparatus tank, a central conductor extending axially through the bushing, a capacitive insulating bushing core located inside said conductive sleeve and surrounding said central conductor, said core having a plurality of radially spaced equipotential surfaces, and an insulating shell connected to and disposed below said conductive sleeve, said insulating shell being adapted to be submerged under a dielectric fluid in said apparatus tank, the improvement comprising:

a. means capping said insulating shell and providing an aperture through which a portion of said central conductor emerges from said bushing, said capping means being constructed of an insulating material;
b. an electrostatic field control electrode embedded in said capping means and disposed intermediate said conductive ground sleeve and said emerging portion of said central conductor; and
c. means electrically connecting said electrode to an intermediate potential equipotential surface of said bushing core to thereby provide a potential point in said high-dielectric strength capping means at said intermediate potential.

2. The improved bushing as specified in claim 1 wherein said electrode is a ring disposed about the aperture in said capping means 3. The improved bushing as specified in claim 2 wherein said capping means is constructed of a glass-reinforced epoxy.

4. The improved bushing as specified in claim 2 wherein said capping means has a domed end through which said central conductor passes, and wherein said central conductor comprises a cable covered with insulation which increases in cross-sectional area immediately adjacent the point at which the central conductor emerges from said bushing.

5. In an oil-filled high-voltage bushing comprising an electrically conductive sleeve adapted to be connected to a grounded apparatus tank, a central conductor extending axially through the bushing, a capacitive insulating bushing core located inside said conductive sleeve and surrounding said central conductor, said core having a plurality of radially spaced equipotential surfaces, and an insulating shell connected to and disposed below said conductive sleeve, said insulating shell being adapted to be submerged under a dielectric fluid in said apparatus tank, the improvement comprising:

a. means capping said insulating shell and providing an aperture through which a portion of said central conductor emerges from said bushing, said capping means being constructed of an insulating material;
b. a first electrostatic field controlelectrode disposed in said capping means adjacent said central condctr, said first electrode being at an electrical potential sbstantially equal t the electrical potential f said central cnductor;
c. a second electrostatic field control electrode embedded in said capping means intermediate said first electrode and said electrically conductive sleeve; and
d. means electrically connecting said second electrode to an intermediate potential equipotential surface of said bushing core to thereby provide a potential point in said high-dielectric strength capping means at said intermediate potential.

6. The improved bushing as specified in claim 5 wherein said first electrode is a flared tube disposed about the aperture in said capping means.

7 The improved bushing as specified in claim 6 wherein said second electrode is a ring disposed about the aperture in said capping means.

8. The improved bushing as specified in claim 6 wherein said capping means is constructed of a glass-reinforced epoxy.

9. The improved bushing as specified in claim 6 wherein said capping means as a domed end through which said central conductor passes, and wherein said central conductor comprises a cable, covered with insulation which increases in cross-sectional area immediately adjacent the point at which the central conductor emerges from the bushing.

10. The improved bushing as specified in claim 5 wherein said second electrode is a ring disposed about the aperture in said capping means.

* * * * *